United States Patent [19]

Galloway et al.

[11] Patent Number: 5,127,358
[45] Date of Patent: Jul. 7, 1992

[54] APPARENT WIND DIRECTION INDICATOR

[76] Inventors: Peter Galloway, 26 Friendlee La., Wilton, Conn. 06897; Peter L. Wilson, 722 Silvermine Rd., New Canaan, Conn. 06840

[21] Appl. No.: 706,799

[22] Filed: May 29, 1991

[51] Int. Cl.⁵ .............................. G01P 13/02
[52] U.S. Cl. ............ 116/265; 116/DIG. 43; 73/188
[58] Field of Search ............ 116/265, 264, 273, 274, 116/DIG. 43, DIG. 7, 328, 327, 330, 333, 28 R, 35 R, 39, 46, 47, 51, 266, 271; 73/188, 189, 186, 180, 178 R; 114/144 C

[56] References Cited

U.S. PATENT DOCUMENTS

| 1,068,169 | 7/1973 | Ricketts | 73/188 |
| 1,384,867 | 7/1921 | Sperry | 73/180 |
| 3,224,269 | 12/1965 | Weir | 73/189 |
| 4,283,943 | 8/1981 | Schoneberger, Jr. | 116/26 X |
| 4,488,431 | 12/1984 | Miga | 73/188 X |
| 4,646,567 | 3/1987 | Ahmer | 73/188 |

FOREIGN PATENT DOCUMENTS

| 0085263 | 8/1921 | Fed. Rep. of Germany | 73/180 |
| 2320809 | 11/1974 | Fed. Rep. of Germany | 73/188 |
| 1472487 | 3/1967 | France | 73/188 |
| 1558630 | 2/1969 | France | 73/188 |

Primary Examiner—William A. Cuchlinski, Jr.
Assistant Examiner—John L. Beres

[57] ABSTRACT

Masthead device for sailboats that indicates apparent wind direction composed of a rotating wind vane and a protractor arm encompassing multiple reference marks. These marks can be adjusted with greater compass accuracy to allow several settings in each quadrant creating a series of reference points enabling one to more accurately determine the apparent wind angle from a center point, and thus optimize sail trim, heading and boat speed.

12 Claims, 3 Drawing Sheets

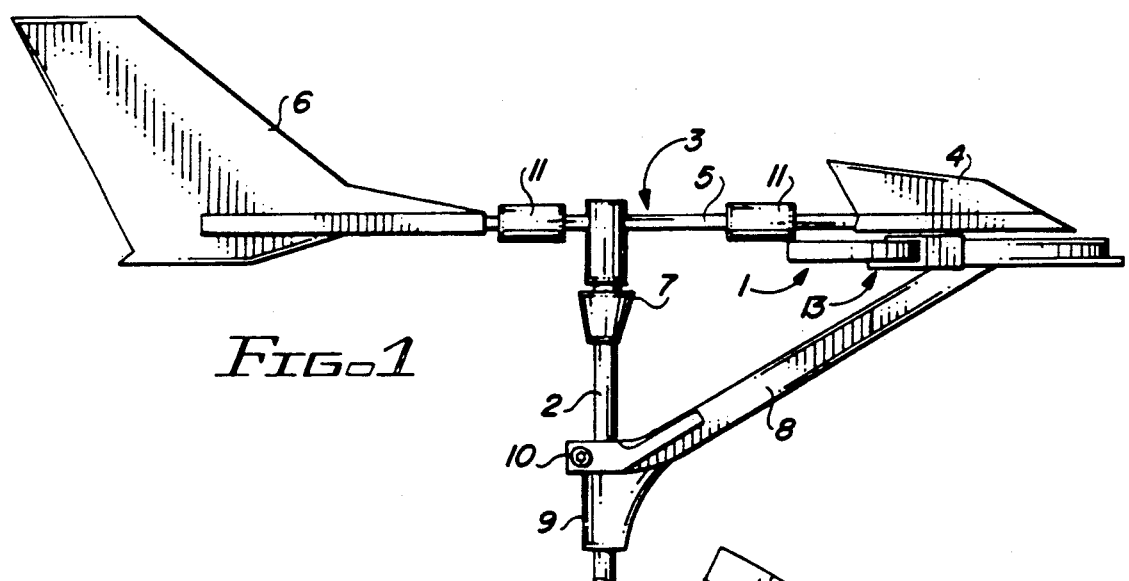
FIG. 1
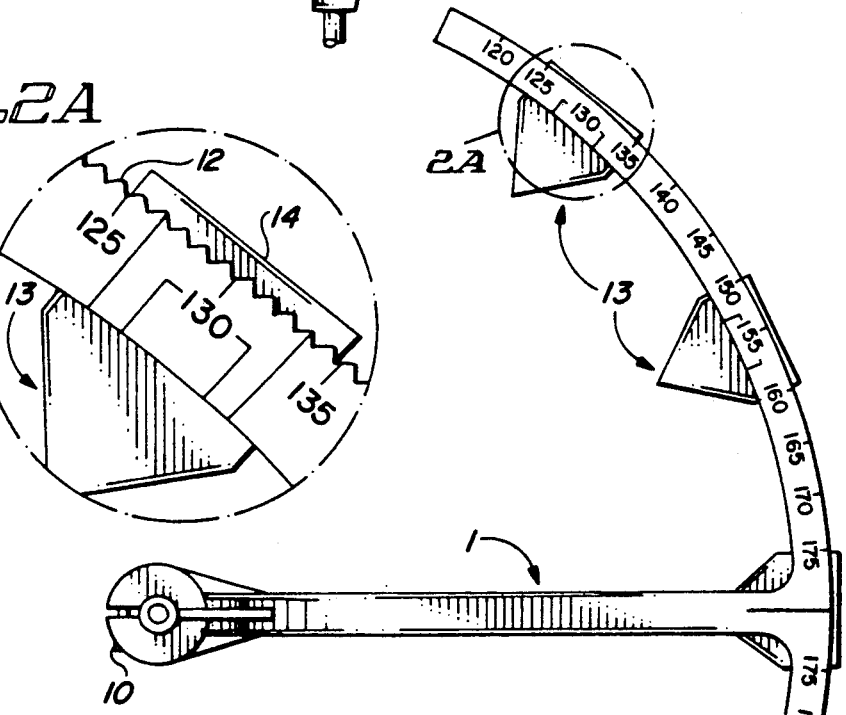
FIG. 2A
FIG. 2

APPARENT WIND DIRECTION INDICATOR

TECHNICAL FIELD

The present invention relates to an improvement over conventional masthead apparent wind indicators used extensively on, for example, racing sailboats around the world.

BACKGROUND OF THE INVENTION

Apparent wind direction indicators, generically referred to as masthead flys, typically consist of a vane on top of a short post atop the mast that rotates freely to point toward the apparent wind (which is a function of true wind direction/velocity, and boat speed/course). They provide a relative measure of wind direction which serves as reference point for trimming sails and choosing a course to steer the boat.

Masthead flys include two reference marks which have a fixed position approximately 145 degrees aft of dead ahead (forward), one mark to port and one to starboard. These reference marks are designed to allow the user to approximate whether the apparent wind angle is more, less, or the same as 35 degrees when sailing upwind, or 145 degrees when sailing downwind. These two reference marks are typically small squares constructed from, for example, cloth or plastic or alternatively these reference marks are the end of wire arms radiating from a post that holds the wind vane. These current designs make it very difficult to ensure any accuracy of the angles they are supposed to represent because the wires flex and their originating points are to close to the post and further because they rely upon the user approximating the angle when setting the reference marks.

Optimizing the speed of today's racing sailboats depends on relatively fine adjustments in course steered and sail trim relative to very small changes in wind direction and velocity, as can be indicated by an angle change in the vane of the masthead fly. Available masthead flys do not provide enough accuracy to assess these changes which occur continuously while sailing a race.

It it therefore an objective in the present invention to provide a device with improved accuracy of measuring apparent wind angles at the masthead, thereby significantly enhancing the user's ability to trim sails and steer the boat to achieve optimum speed through the water or speed towards the next mark of the course. It is further object of the present invention to provide such a device which is easy to manufacture and can therefore be manufactured at the lowest possible manufacturing cost so the wind indicator can be used by sailboats of all sizes.

SUMMARY OF THE INVENTION

The present invention relates to an apparent wind direction indicator device comprising a freely rotating wind vane, center post and at least one adjustable reference mark radiating from said center post of the device, said adjustable reference mark having means to be affixed to a means for measuring the angle between the head of said vane and said reference mark.

Preferably, the means for measuring the angle between the vane and reference mark(s) is a protractor arm having compass markings inscribed thereon, and the means for affixing the adjustable reference marks to said protractor arm is a ridge and groove system which provides a friction fit and holds the reference mark(s) in place.

DISCLOSURE OF THE INVENTION

In a particularly preferred embodiment, the present invention comprises an apparent wind direction indicator comprising one or preferably a plurality (2 or more) of reference marks attached to a protractor arm having compass markings inscribed thereon underneath the wind vane that will allow more fixed points against which to sight the angle of the wind vane, and to visually measure changes in angle due to a shift in true wind direction/velocity, or a change in course steered. One additional reference mark can be fixed in the dead aft-/astern (e.g., 180 degrees) position. Then one or more reference marks (preferably two or three) are fixed in each aft quadrant starboard and port between e.g., 120 degrees and e.g., 180 degrees relative to the bow of the boat. This embodiment allows for three or more reference points on each tack or jibe against which to more accurately measure a change in apparent wind angle/direction.

Further, we envision that these multiple reference marks be either fixed, or preferably, adjustable allowing each individual user to preset them as is most appropriate for one or more of the following reasons: 1) making it easier to observe changes in the wind angle with naked eye depending on the height of the mast; 2) setting the marks at those relative wind angles at which the boat sails fastest in commonly occurring wind conditions as determined by experience; and 3) setting the marks at those relative wind angles that the boat's designer deems correct for optimum speed in different wind conditions. Preferably, the accuracy of presetting these reference marks will be accomplished by a protractor arm with compass points marked relative to the boats bow (dead ahead), although we envision other ways to accomplish "compass accurate" settings. The adjustable reference marks are moveably affixed to the protractor arm i.e., they can be moved to desired locations along the protractor arm and secured in place with, for example, set screws or other such methods of fastenings to secure them.

To further enhance measurement accuracy of the apparent wind angle, we have determined that in the present invention a wind vane designed with a large tail fin helps stabilize the vane when changes in boat pitch, roll, or yaw create counteracting forces to the wind that could cause the vane to jump around. This situation occurs particularly in light winds and choppy waves. We have also designed optional adjustable damping in the vane to allow the user to optimize the damping for the particular characteristics of the boat.

Another feature to improve the accuracy of visually measuring the apparent wind angle is in the preferred shape of the reference marks and the ends of the wind vane. We have designed shapes that will visually interlock as seen from underneath when the wind vane is directly over the reference mark, providing optimum e.g., at least one degree of, accuracy vis-a-vis the compass accurate preset angle of the reference mark. Preferably, reflective paint or tape is used on the underside of the reference marks and vane ends.to enhance visibility at night when a flashlight, masthead light, or even ambient light shines on the device.

BRIEF DESCRIPTION OF THE DRAWINGS

While the specification concludes with claims particularly pointing out and distinctly claiming the present invention, it is believed that the present invention will be better understood from the following description in conjunction with the accompanying drawings in which:

FIG. 1 is a side view showing the wind vane on its vertical post and the horizontal protractor arm under the vane.

FIG. 2 is a top view showing the protractor arm with grooves and ridges for adjustable reference marks, compass markings, and several adjustable reference marks.

DESCRIPTION OF PREFERRED EMBODIMENT

Figure 3A:
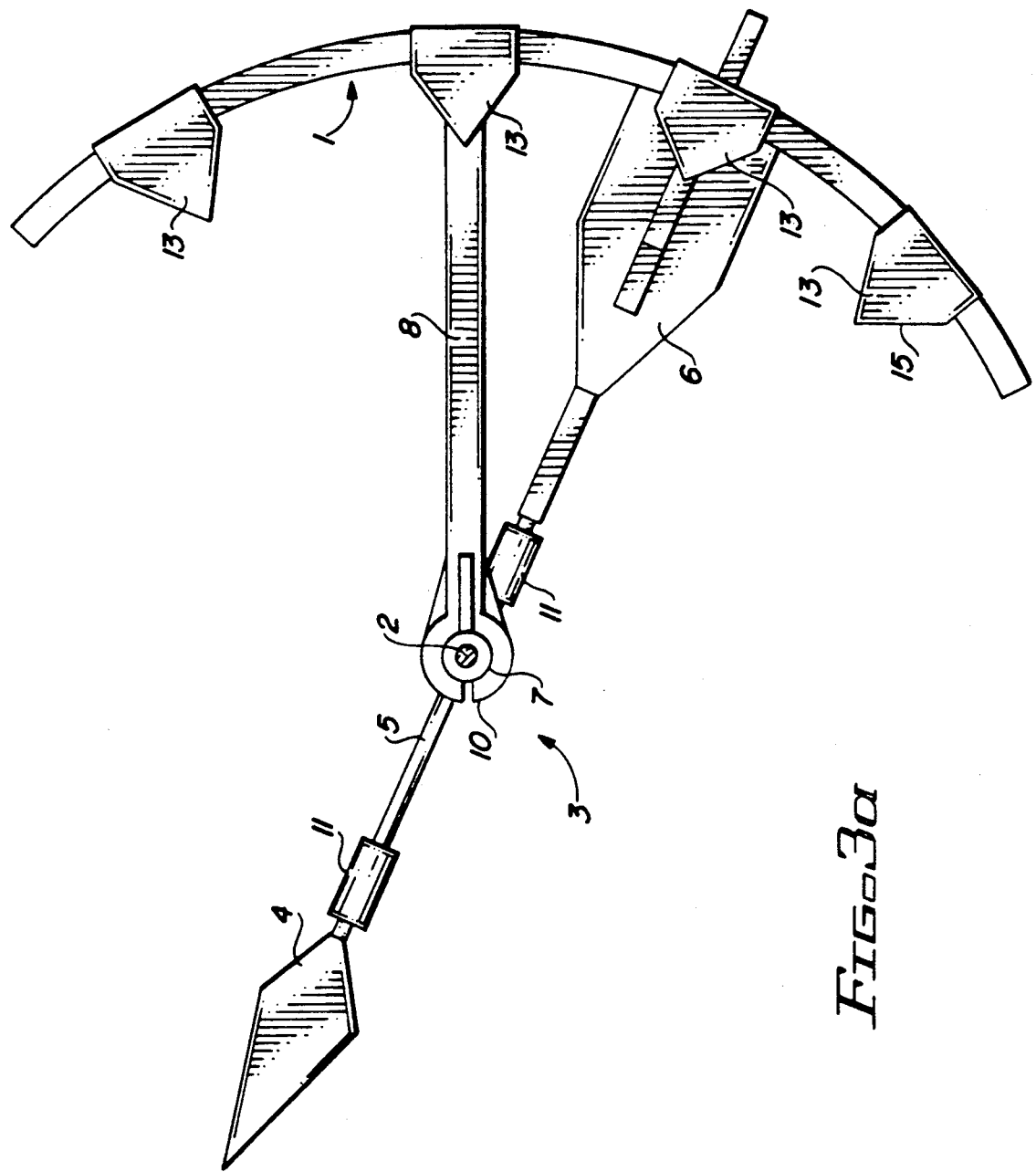
FIGS. 3a and 3b are bottom views showing the wind vane and protractor arm illustrating visual interlock of the vane and reference mark.

Although it is recognized that other configurations are possible, the drawings represent one specific embodiment of the invention. Further, advantageous use of the apparent wind direction indicator is in no way limited to sailing. The devices of the present invention may be used for any purpose where measuring the apparent (or true) wind direction is necessary.

FIG. 1 is a side view of the device. It consists of a protractor arm 1 (the preferred means for measuring angles in the present invention) mounted on a vertical post 2 in a fixed horizontal position, with a freely rotating 360 degree wind vane 3 comprising a head 4, shaft 5 and tail 6 on top of the post 2. Wind causes the vane 3 to sweep over the protractor arm 1. Materials useful in constructing the device include, but are not limited to, light weight metals (e.g., aluminum and the like), plastic (transparent or opaque) or composites. The materials utilized in the present invention should preferably provide maximum rigidity to hold up against adverse forces such as in heaving winds/seas, but are preferably very light so as not to increase pitching moment due to significant weight at the masthead when used in sailing. The wind vane 3 should preferably be mounted on a rotating bearing 7 that allows easy movement of the vane 3 to align with the direction of the wind. The protractor arm 1 is preferably attached to the vertical post 2 by means of a support member 8 which is affixed to the post 2 by means of a bracket 9 which is controlled by a set screw 10. This allows for vertical and horizontal adjustment of the protractor arm 1. Further, the movement of the vane 3 can be controlled by use of optional damping weights 11 which are provided along the length of the shaft 5.

FIG. 2 shows the protractor arm 1 that spans the aft quadrants from e.g., approximately 120 degrees on the starboard side to 120 degrees on the port side. Optionally, the protractor arm 1 has a ridges 12 for each desired compass setting (e.g., every one degree) along which the reference marks 13 (which can, for example, be made arrow-like in shape) can be moved to the desired location on the protractor arm 1 and be removeably locked in place. Inscribed (e.g., embossed, debossed or printed) in the face plate of the protractor arm 1 preferably are compass points in the desired increments (for example, every one degree) covering from e.g., 120 degrees starboard through 180 degrees to 120 degrees port. FIG. 2 provides a representation where the degrees are numerically designated every five degrees (120, 125, 130, etc.). Further, other markings such as lines can be inscribed between the numerical designations to represent additional defined degree markings (e.g., each single degree). Optionally, the markings can be removeably affixed to the device so that the they can be changed, for example, in size, degree representation or color. The reference marks 13 are preferably adjusted by sliding the reference mark 13 along the protractor arm 1 and locked in place. This can be accomplished by, for example, the use of a set screw. In a preferred embodiment, the reference mark 13 is locked in place by a friction fit of a ridge 12 into a groove 14. This is the preferred system to hold the reference mark 13 in place.

Figure 3B:
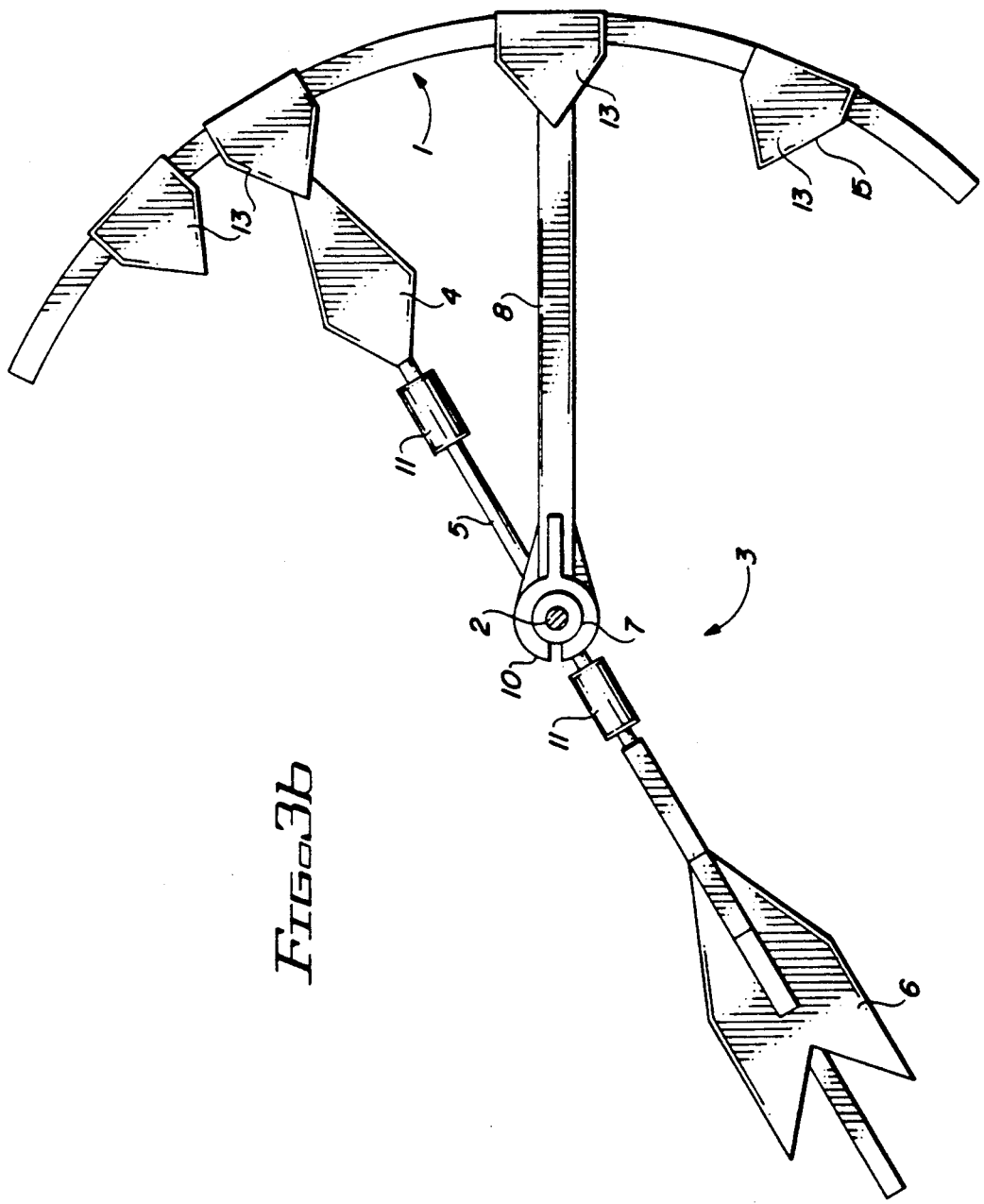

FIGS. 3a and 3b show the complete device, wind vane 3, protractor arm 1 and multiple reference marks 13 in the shape of arrows as viewed from the underside (i.e., how it would appear to one underneath looking up towards the top of the mast). The reference marks 13 in the form of arrows are shaped to visually interlock with the wind vane's 3 front and tail design when the vane 3 is directly over the reference mark 13. The underside of each reference mark 13 preferably is coated with a reflective surface 15 which can be any color. The underside of the wind vane's 3 front and tail design can also have reflective surfaces, which can be of the same or different color that used on the reference marks 13. The tail fin 6 is preferably large in order to ensure high sensitivity to changes in wind direction with minimum variability induced by roll, pitch and yaw. Optional damping weights 11 can be moveably attached along the shaft 5 having a friction fit which can thereby be moved outward to reduce damping or inward towards the center to increase damping.

In an alternate embodiment, the wind direction indicator device of the present invention comprises a freely rotating wind vane, center post, reference mark and a protractor arm wherein said reference mark is attached to and radiates from said center post and further wherein the angle between said wind vane and said reference mark can be measured by means of said protractor arm. Preferably, at least two and more preferably at least three reference marks are attached to and radiate from said center post. This device provides benefits beyond those devices known in the art in that it provides improved ability to make sail trim and course changes in order to optimize boat speed. When three or more reference marks are attached to said center post, this provides significantly improved ability to assess changes in wind direction. Preferably, the protractor arm of the masthead apparent wind direction device comprises a flat horizontal surface having compass markings inscribed thereon and is attached to said center post by means of a support member affixed to said center post and wherein said protractor arm may be adjusted along the vertical and horizontal axes of said center post. It is also preferred that said markings are removeably affixed to said protractor arm.

We claim:

1. An apparent wind direction indicator device comprising a freely rotating wind vane, center post and at least two adjustable reference marks radiating from said center post of the device, said adjustable reference marks having means to be affixed to a means for measuring the angle between the head of said vane and said reference marks and wherein said means for measuring the angle between said vane and said reference marks comprises a protractor arm.

2. A wind direction indicator device according to claim 1 wherein said reference marks are moveably affixed to said protractor arm.

3. A wind direction indicator device according to claim 2 wherein said reference marks comprise grooves and said protractor arm comprises ridges such that said reference marks can be fit by means of friction.

4. A wind direction indicator device according to claim 3 wherein said protractor arm has inscribed compass points.

5. A wind direction indicator device according to claim 4 wherein said protractor arm is attached to said center post by means of a support member affixed to said center post wherein said protractor arm may be adjusted along the vertical and horizontal axes of said center post.

6. A wind direction indicator device according to claim 5 having means for damping said wind vane in order to improve the sensitivity of said vane to wind velocity.

7. A wind direction indicator device according to claim 6 wherein said means for damping said wind vane comprises one or more adjustable damping weights moveably affixed to the shaft of said vane.

8. A wind direction indicator device according to claim 7 wherein said compass points are inscribed every five degrees upon said protractor arm.

9. A masthead apparent wind direction device according to claim 8 wherein said markings are removeably affixed to said protractor arm.

10. An apparent wind direction indicator device comprising a freely rotating wind vane, center post, at least two reference marks and a protractor arm wherein said reference marks are attached to and radiate from said center post and further wherein the angle between said wind vane and said reference marks can be measured by means of said protractor arm and wherein said protractor arm comprises a flat horizontal surface having compass markings inscribed thereon and is attached to said center post by means of a support member affixed to said center post and wherein said protractor arm may be adjusted along the vertical and horizontal axes of said center post.

11. A masthead apparent wind direction device according to claim 10 wherein said markings are removeably affixed to said protractor arm.

12. A wind direction indicator device according to claim 11 wherein said compass points are inscribed every five degrees upon said protractor arm.

* * * * *